United States Patent [19]
Klein et al.

[11] Patent Number: 6,163,326
[45] Date of Patent: Dec. 19, 2000

[54] INPUT DEVICE FOR A LAPTOP COMPUTER

[75] Inventors: Dean A. Klein, Eagle; Hoyt A. Fleming, III, Boise, both of Id.

[73] Assignee: Micron Electronics, Inc., Nampa, Id.

[21] Appl. No.: 09/031,149

[22] Filed: Feb. 26, 1998

[51] Int. Cl.[7] .............................. G09G 5/00; G09G 5/08; G06F 1/16
[52] U.S. Cl. ...................... 346/156; 345/163; 345/168; 361/680; 361/681; 361/683; 361/686
[58] Field of Search ..................................... 361/680, 681, 361/683, 685, 686; 345/163, 156, 901, 168

[56] References Cited

U.S. PATENT DOCUMENTS

| | | |
|---|---|---|
| 5,021,771 | 6/1991 | Lachman . |
| 5,231,380 | 7/1993 | Logan . |
| 5,287,246 | 2/1994 | Sen . |
| 5,341,154 | 8/1994 | Bird . |
| 5,428,355 | 6/1995 | Jondrow et al. . |
| 5,473,347 | 12/1995 | Collas et al. ............................. 345/169 |
| 5,490,039 | 2/1996 | Helms . |
| 5,546,334 | 8/1996 | Hsieh et al. . |
| 5,600,580 | 2/1997 | Honjo et al. . |
| 5,615,083 | 3/1997 | Burnett . |
| 5,671,833 | 9/1997 | Edwards et al. ................... 191/12.2 R |
| 5,687,058 | 11/1997 | Roylance . |
| 5,706,167 | 1/1998 | Lee ........................................ 361/680 |
| 5,786,806 | 7/1998 | Fester ..................................... 345/161 |
| 5,790,100 | 8/1998 | Kikinis .................................. 345/158 |
| 5,793,355 | 8/1998 | Youens ................................. 345/157 |
| 5,886,686 | 3/1999 | Chen ..................................... 345/168 |
| 5,995,025 | 11/1999 | Sternglass et al. . |

*Primary Examiner*—Jeffery Brier
*Assistant Examiner*—Ryan Yang
*Attorney, Agent, or Firm*—Perkins Coie LLP

[57] ABSTRACT

A detachable device for a laptop computer. The laptop computer has a base and a display housing coupled to the base. The display housing is movable relative to the base between a closed position in which the computer is in a stowed configuration and an open position in which the computer is in an unstowed configuration and the display housing and base are accessible to a user. The input device includes controls that receive commands from the user and transmit the commands to the computer via a communication link. In one embodiment, the input device may be attached to the computer by positioning it within an aperture of the base. The input device may be detached from the computer by removing it from the aperture. The controls of the input device may remain accessible to the user when the input device is either attached to or detached from the base. The computer may be placed in the stowed configuration when the input device is in the attached position.

37 Claims, 3 Drawing Sheets ically used.

INPUT DEVICE FOR A LAPTOP COMPUTER

TECHNICAL FIELD

The present invention is directed toward an input device for a laptop computer.

BACKGROUND OF THE INVENTION

Laptop computers are portable computers that generally operate from either external or portable power sources. Conventional laptop computers typically have a base pivotably connected to a display housing. The base typically includes a primary input device, such as a keyboard, and the display housing typically includes a liquid crystal display (LCD) or other type of display. To access the keyboard and the display, a user positions the base on a surface (e.g., the user's lap or a fixed surface) and pivots the display housing away from the base. To stow and easily transport the computer after use, the user pivots the display housing toward the base and secures the display housing to the base in a stowed configuration.

Conventional laptop computers typically include at least one additional input device to supplement the keyboard. The additional input device may include a roller ball, touch pad, joystick or similar device used to manipulate or move images on the display. In one conventional approach, the additional input device is an integral, permanent component mounted to a central portion of the computer base adjacent to the keyboard. One drawback with this additional input device is that the user may wish to position the device to one side of the base. For example, the user may wish to manipulate the additional input device with the right hand, and may accordingly wish to position the device toward the right side of the base. A further drawback is that the user may wish to detach the additional input device from the base to manipulate the device in a position remote from the computer. For example, where space permits and where the additional input device includes a rotatable ball, the user may wish to place the additional input device on a mouse pad and operate it in a manner similar to the way in which the user might operate the mouse of a conventional desktop computer.

One known approach to address these drawbacks is to removably clip a detachable input device to an edge of the base. One conventional detachable input device has an exposed roller ball positioned in an upper surface, and a spring-loaded clip that fits between the edge of the base and the keyboard to bias the detachable input device against the base. However, this detachable input device suffers from several additional drawbacks. For example, the user typically removes such a detachable input device from the base and stows it separately from the computer because the input device is not protected within the base or display housing when the computer is in the stowed configuration. Such a detachable input device is thus more likely to be misplaced or lost. Furthermore, the user typically needs to couple such a detachable input device to the computer before operation by unpacking the detachable device, attaching it to the base, and connecting a cable between the detachable device and the computer. As such, attaching the detachable input device may be time consuming and difficult to perform in constrained environments where laptop computers are typically used.

Another drawback with conventional detachable input devices is that the detachable devices may not be configured to engage surfaces other than the edge of the base to which they are removably attached. Accordingly, the conventional detachable input devices may be difficult to use unless they are properly secured to the edge of the base. Yet a further drawback with conventional detachable input devices is that it may be difficult to adequately secure them to the base. Accordingly, the detachable devices may be accidentally separated from the base if they are jostled or bumped, requiring the user to take time to reattach the input devices. This drawback is particularly problematic when such detachable input devices are used in airplanes, buses or other cramped and crowded environments where the devices may be easily jostled and where it may be inconvenient to reattach the devices to the computer base.

One conventional approach to address some of the foregoing problems with conventional detachable input devices is to provide the laptop computer with a first additional input device fixed to the computer base and a second additional input device detachable from the base. The second additional input device may be a mouse with a cable that may be removably attached to a communication port on the computer. As discussed above, one drawback with this approach is that the user must attach the second additional input device to the computer before using the second device and must detach the second device before stowing the computer.

SUMMARY OF THE INVENTION

The present invention is directed toward a laptop computer and a detachable input assembly for a laptop computer. In one embodiment, the laptop computer has a first portion, a second portion coupled to the first portion, and an input assembly having a detachable input device received in one of the first and second portions. The second portion may be movable relative to the first portion between a closed/stowed position and an open/unstowed position. The input device may be movable relative to the computer between an attached position and a detached position. For example, the input device is received by the computer in the attached position and separated from the computer in the detached position. The input device may be accessible to receive commands from a user in either the attached position or the detached position, and it may transmit the commands to the computer via radio signals, infrared signals or a cable. The computer and the input device are configured to be transported as a unit when the second portion is in the closed position and the input device is in the attached position.

In one particular embodiment, the second portion of the computer pivots relative to the first portion between the stowed position and the unstowed position. The input device in this embodiment is accessible to receive commands from the user when the input device is in the attached position and the second portion is in the open or unstowed position. In another embodiment of the invention, the input device has at least one surface configured to engage a substantially flat work surface in a manner that keeps the input device in a desired operating position when the input device is in the detached position. In a further aspect of this embodiment, the at least one surface includes a rotatable ball to engage the work surface when the input device faces downwardly toward the support surface in the detached position. This embodiment of the input device may be inverted to face upwardly in the attached position so that the user may directly manipulate the rotatable ball when the input device is in the attached position.

DETAILED DESCRIPTION OF THE INVENTION

The present invention is directed toward an input device for a laptop computer. The input device may be attached to or detached from the laptop computer, and it may be accessible to a user in either the detached or attached positions. Many specific details of certain embodiments of the invention are set forth in the following description and in FIGS. 1–7 to provide a thorough understanding of such embodiments. One skilled in the art, however, will understand that the present invention may have additional embodiments and may be practiced without several of the details described in the following description.

Figure 1:
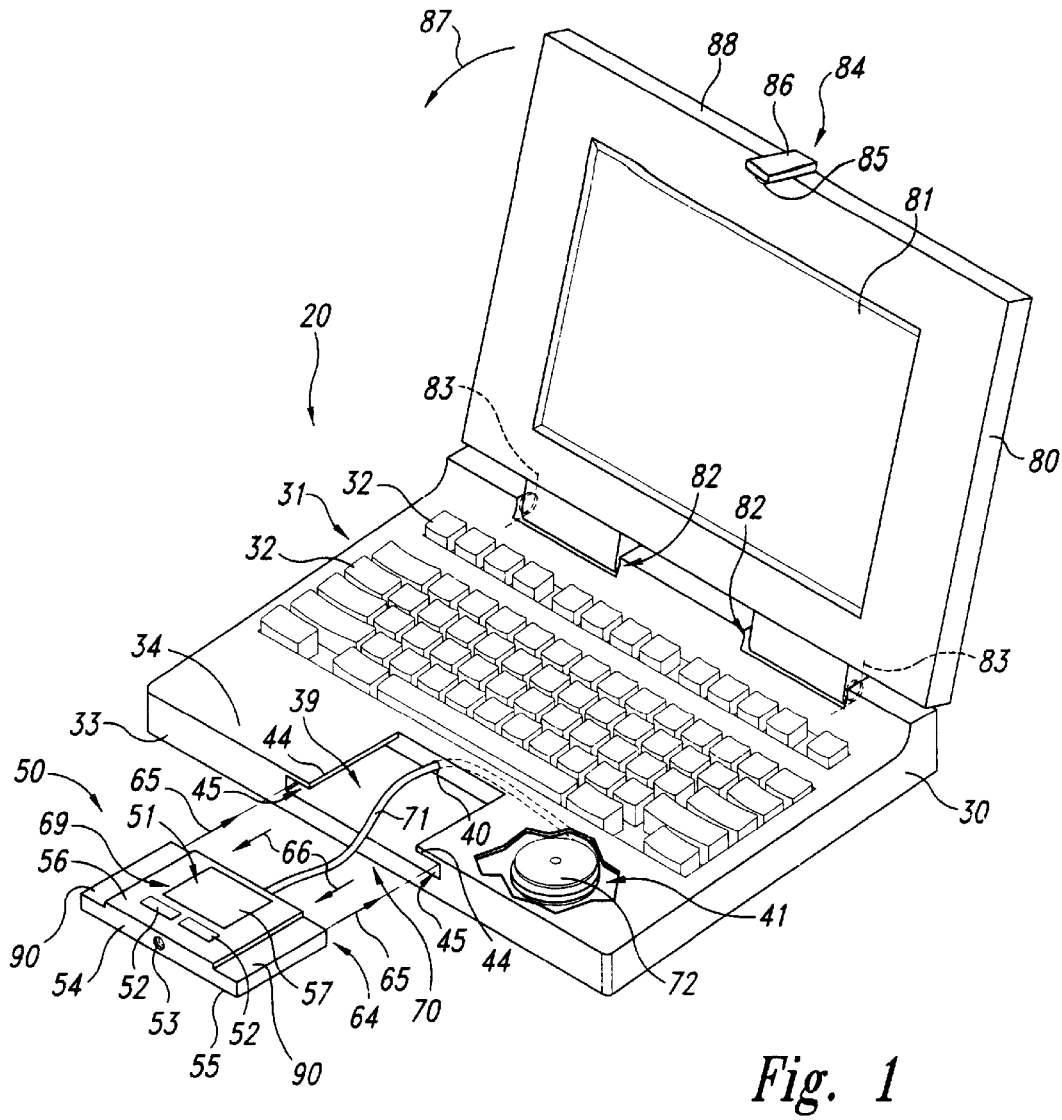
FIG. 1 is a top isometric view of a laptop computer coupled to an input device in accordance with an embodiment of the invention.

FIG. 1 is a top isometric view of a laptop computer 20 having a base 30 coupled with hinges 82 to a display housing 80. The base 30 may include a first input device, such as a conventional keyboard 31 having a plurality of input keys 32, and the display housing 80 may include a display 81, such as a conventional liquid crystal display (LCD). When in use, the display housing 80 may be pivoted away from the base 30 to an operating or unstowed configuration (shown in FIG. 1) so that both the display 81 and the keyboard 31 are accessible to the user. When the computer 20 is not in use, the computer may be stowed for transport by pivoting the display housing 80 toward the base 30 and securing the display housing 80 and the base 30 together in a closed or stowed configuration.

An input assembly in accordance with an embodiment of the invention includes a second input device 50 removably attached to the base 30. The second input device 50 includes input controls 69 which may be manipulated by the user to generate command signals. The command signals may be transmitted to the computer 20 via a communication link 70 that operatively couples the second input device 50 with the computer 20. The user may access the input controls 69 when the second input device 50 is attached to, or detached from, the base 30. As described in greater detail below, the user may operate the second input device 50 in an attached position (not shown) when the computer is used in a confined environment, or the user may operate the second input device in a detached position (shown) when space permits.

In one embodiment, the second input device 50 is configured to fit within an aperture 39 of the computer 20. In the embodiment shown in FIG. 1, the aperture 39 is positioned in the base 30. In other embodiments, the aperture 39 may be positioned in other portions of the computer 20, such as the display housing 80. In one embodiment, the aperture 39 is at least partially open to both an upper surface 34 and a forward surface 33 of the base 30. Accordingly, the second input device 50 may be moved from the detached position (shown in FIG. 1) to the attached position (not shown) by translating it through the opening in the forward surface 33 into the aperture 39 (arrows 65). The second input device 50 may be detached from the base 30 by translating it outwardly from the aperture 39 (arrows 66).

In one embodiment, the second input device 50 reaches the attached position when a forward surface 54 of the second input device 50 is flush with the forward surface 33 of the base 30. In other embodiments, the forward surface 54 of the second input device 50 may project outwardly from or be positioned slightly within the forward surface 33 when in the attached position. In any of the foregoing embodiments, a plurality of overhanging portions 44 of the base 30 define opposing slots 45 on opposite sides of the aperture 39. The slots 45 are configured to removably receive corresponding flanges 90 on opposite sides of second input device 50 when the second input device 50 is in the attached position. As shown in FIG. 1, the overhanging portions 44 cover the flanges 90 to restrict vertical movement of the second input device 50 out of the aperture 39 in the attached position. The overhanging portions, however, do not cover an upper surface 56 of the second input device 50 so that the controls 69 are accessible to the user when the second input device 50 is in the attached position.

In one embodiment, the second input device 50 may have a generally rectangular housing 64 with the forward surface 54, a lower surface 55, and the upper surface 56. The housing 64 is generally configured to be held by the user in either one or two hands. Alternatively, the user may place the housing 64 on a work surface, such as a desktop or mouse pad. The lower surface 55 of the housing 64 may accordingly be flat to engage the desktop or other flat work surface in a manner that positions the second input device 50 in a desired operating position. Generally, the lower surface 55 holds the second input device 50 steady and stable against the flat work surface. The upper surface 56 may thus be configured to accommodate the input controls 69 in a position where the user may easily engage them with a desired digit.

The input controls 69 may include a pointing device 51 and two input switches 52 to generate signals that are transmitted to the computer 20 via the communications link 70. In the embodiment shown in FIG. 1, the pointing device 51 is a touch-sensitive pad 57 to move images on the display 81 as the user moves his or her fingers across the surface of the touch pad 57. In other embodiments, the pointing device 51 may be other devices, as will be discussed in greater detail below with reference to FIGS. 3–6. In still further embodiments, the pointing device 51 and the input switches 52 may be positioned on other surfaces of the housing 64, so long as they may be easily engaged by the user.

The communication link 70 operatively couples the second input device 50 to the base 30 to transmit the signals between the input controls 69 and the computer 20. In one embodiment, the communication link 70 is a cable 71 extending between the second input device 50 and the base 30. The computer 20 may include a take-up device to control the cable 71 as the second input device 50 is moved relative to the base 30. The take-up device may be positioned in either the second input device 50 or the base 30. In the embodiment shown in FIG. 1, the take-up device has a reel 72 rotatably mounted in a cavity 41 of the base 30 and an internal spring (not shown) to rotate the reel 72 in a clockwise direction. The cable 71 may pass through a hole 40 in the base 30 and be wrapped around the reel 72. Accordingly, when the user moves the second input device 50 relative to the base 30, the internal spring biases the reel 72 to take up slack in the cable 71. The reel 72 may accordingly limit the degree to which the cable 71 interferes with the second input device 50 as the user moves the second input device about. The reel 72 may also prevent the cable 71 from obstructing the aperture 39 when the user attaches the second input device 50 to the base 30.

As discussed above, the display housing 80 may be moved relative to the base 30 to place the computer 20 in the stowed configuration. To stow the computer 20, the user pivots the display housing 80 toward the base 30 (arrow 87) until a forward edge 88 of the display housing is approximately aligned with the forward surface 33 of the base 30. The display housing 80 may be moved to the stowed position while the second input device 50 is in the attached position, and then the display housing 80 may be latched in place to secure it in the stowed position.

In one embodiment, the display housing 80 and the second input device 50 may be configured so that the display housing 80 may be latched in its stowed position only when the second input device is in its attached position. The display housing 80, for example, may include a latch 84 with a tab member 86 and a projection 85 depending from the tab member 86. The projection may be configured to engage a hole 53 in the forward surface 54 of the second input device 50. The latch 84 and the hole 53 operate together to prevent the computer 20 from being stowed when the second input device 50 is in the detached position. For example, because the hole 53 is positioned in the second input device 50, the display housing 80 cannot be secured in the stowed position unless the second input device 50 is in the attached position. In a further aspect of this embodiment, the computer 20 may include a pair of springs 83 positioned to bias the display housing 80 away from the base 30. Accordingly, if the user attempts to latch the display housing 80 without the second input device 50 in the attached position, the display housing 80 will tend to return to the unstowed position and alert the user to the fact that the second input device 50 is detached from the base 30.

In other embodiments (not shown), other latching arrangements may be used to similarly require that the second input device 50 to be in the attached position before the display housing 80 may be latched in the stowed position. In still further embodiments, the display housing 80 may be latched independent of the position of the second input device 50. In one such embodiment, the display housing 80 may be latched directly to the base 30.

The laptop computer 20 having the second input device 50 and the base 30 shown in FIG. 1 may be more versatile and easier to use than conventional laptop computers because it may be adapted for use by a variety of users in a variety of environments. For example, because the second input device 50 may be detached from the computer 20 and moved to a wide variety of positions relative to the computer 20, a particular user may position the second input device in any number of convenient locations according to the user's particular preference. The same second input device 50 may accordingly be suitable for a wide variety of users, each of whom may have a different preferred location for the second input device.

The second input device 50 and base 30 may further enhance the versatility and convenience of the computer 20 because the second input device is accessible to the user when it is in either the detached or attached positions. For example, in particularly cramped or confined situations, the user may access the input controls 69 with the second input device 50 in the attached position. Conversely, in less confined environments, the user may detach the second input device and operate it apart from the base 30. Furthermore, unlike conventional detachable input devices that are clipped to the base 30, the second input device 50 shown in FIG. 1 may be immediately accessible for use upon opening the display housing 80. Accordingly, the user may access the second input device 50 without separately unpacking the second input device and/or coupling the second input device to the computer 20.

Yet another advantage of the second input device 50 and the base 30 shown in FIG. 1 is that the second input device 50 is flush with the edges of the base 30 in the attached position. Accordingly, the second input device 50 is detached from the base 30 when the computer 20 is stowed for travel. Furthermore, the overhanging portions 44 secure the second input device 50 in the attached position. The overhanging portions 44, in combination with the flush position of the second input device 50 reduce the likelihood that the second input device will be loosened from the attached position if it is inadvertently bumped or jostled.

Still a further advantage of the second input device 50 shown in FIG. 1 is that, because the latch 84 is positioned in the display housing 80 and the corresponding hole 53 is positioned in the input device housing 64, the second input device 50 must be in the attached position before the display housing 80 may be secured in the stowed position. Accordingly, the user will be less likely to leave the second input device 50 behind at a workplace when stowing the computer 20. While this feature may appear relatively unimportant when the communication link 70 is a cable 71 fixed to the base 30, the feature may have increased significance when the communication link is a wireless signal transmission system, as is discussed in greater detail below with reference to FIG. 2.

Figure 2:
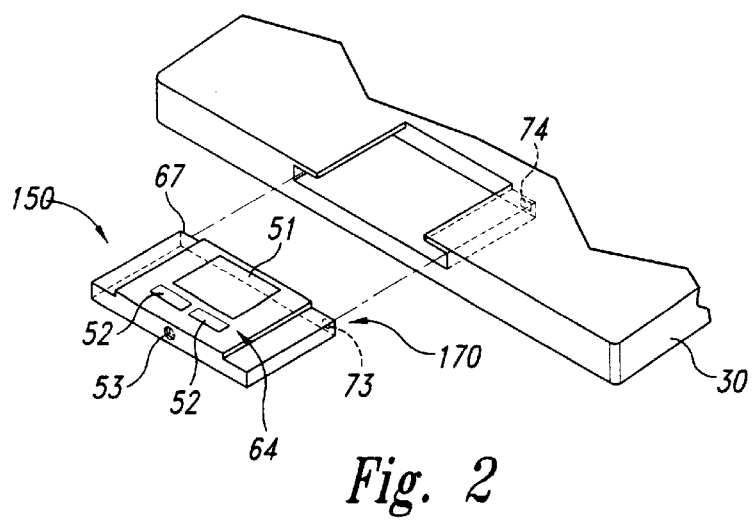
FIG. 2 is a top isometric view of a portion of a base of the laptop computer shown in FIG. 1 and an input device in accordance with another embodiment of the invention.

FIG. 2 is a top isometric view of a portion of the base 30 and a second input device 150 having a wireless communication link 170 in accordance with another embodiment of the invention. As shown in FIG. 2, the communication link 170 includes a transmitter 73 positioned in the second input device 150 and a receiver 74 positioned in the base 30. The input controls 69 send command signals to the transmitter 73, and the transmitter 73 broadcasts the signals at a selected frequency received by the receiver 74. In one embodiment, the transmitter 73 and the receiver 74 transmit and receive, respectively, infrared signals. In another embodiment, the transmitter 73 and receiver 74 operate at radio frequencies. In one aspect of this embodiment, the wireless communication link 170 may include a low-power radio frequency transmitter, such as is disclosed in co-pending U.S. application Ser. No. 08/779,465 titled "Low Power Keyboard," which is incorporated herein by reference. In other embodiments, the transmitter 73 and/or receiver 74 may include other devices and may operate at other frequencies.

As shown in FIG. 2, the transmitter 73 may be positioned in a rear surface 67 of the second input device 150 so that it is aligned with the receiver 74 when the second input device is in the attached position. Accordingly, the transmitter 73 and receiver 74 may operate when the second input device 50 is in either the attached or detached positions. In another embodiment, the computer 20 may have a plurality of receivers 74 at various locations on the computer 20 to better receive signals from the transmitter 73 when the second input device 50 is in any of a wide number of positions. The receivers 74 may accordingly be located in the base 30 and/or the display housing 80 (FIG. 1). In a further embodiment, a second transmitter 73 may be located in the computer 20 and a second receiver 74 may be located in the second input device 50 so that the second input device is capable of receiving as well as transmitting signals. Such an embodiment may be advantageous where it is desirable to provide feedback to the second input device 150.

The communication link 170 allows the second input device 150 to be moved freely relative to the base 30 without being encumbered by a cable. The user may accordingly use the second input device 150 in a wide variety of positions, limited only by the range of the communication link 170. Conversely, an advantage of an embodiment of the communication link 70 shown in FIG. 1 is that it may be less expensive to install and, because it includes a physical connection between the second input device 150 and the computer 20, may reduce the likelihood that the second input device will be inadvertently separated from the computer.

Figure 3:
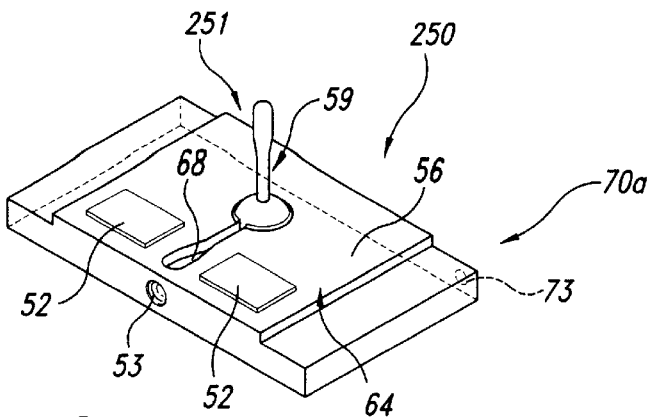
FIG. 3 is a top isometric view of an input device in accordance with yet another embodiment of the invention.

In addition to the pointing device 51 shown in FIGS. 1 and 2, the second input device may include several other pointing mechanisms. As shown in FIG. 3, for example, the pointing device 251 may be a joystick 59 which is pivotable in a conventional manner. The second input device 250 may further include a slot or depression 68 in the upper surface 56 that is configured to receive the joystick 59 in a folded position. Accordingly, the joystick 59 may be inserted into the slot 68 so that the joystick 59 does not interfere with the display housing 80 (FIG. 1) when the display housing 80 is in the stowed position. In a further aspect of this embodiment, the joystick 59 may include an overcenter device or similar locking mechanism to keep it in the slot 68 once it has been positioned therein and further reduce the likelihood that the joystick will interfere with the display housing 80 in the stowed position.

Figure 4:
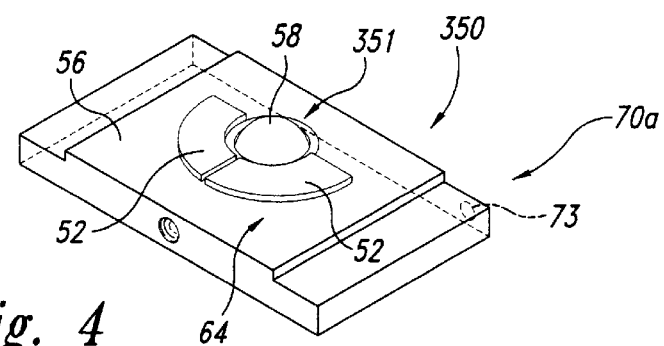
FIG. 4 is a top isometric view of an input device in accordance with still another embodiment of the invention.

FIG. 4 illustrates another embodiment of the pointing device 351 in which a roller ball 58 projects, in part, from the upper surface 56 of the second input device 350. The user may rotate the roller ball 58 in a conventional manner to generate input signals that move an indicator across a screen of the display 81 (FIG. 1). An advantage of the joystick 59 and the roller ball 58 shown in FIGS. 3 and 4, respectively, is that some users may prefer these input devices to the touch pad 57 shown in FIGS. 1 and 2.

Figure 5:
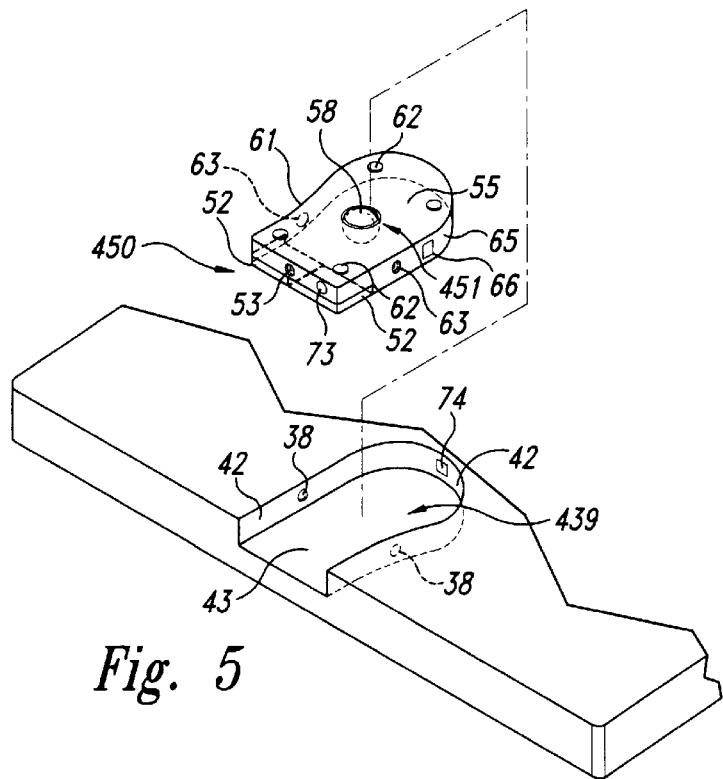
FIG. 5 is a top isometric view of a portion of a base of the computer shown in FIG. 1 configured to receive an input device in accordance with still another embodiment of the invention.

FIG. 5 is a top isometric view of a portion of a base 30 configured to receive a second input device 450 in accordance with another embodiment of the invention. For purposes of clarity, the second input device 450 is shown in an inverted position in FIG. 5 with the lower surface 55 facing up. The pointing device 451 of the second input device 450 comprises a roller ball 58 positioned in the lower surface 55. The roller ball 58 is configured to rotate relative to the lower surface 55 in a conventional manner as the second input device 450 is translated over a generally flat work surface (not shown). In one aspect of this embodiment, the lower surface 55 of the second input device 450 is flat to correspond with the flat work surface. In another aspect of this embodiment, the lower surface 55 may include standoffs 62 projecting away from the lower surface to engage the work surface when the second input device 450 is in operation. The standoffs 62 may be small enough to reduce the frictional forces between the second input device 450 and the work surface as the second input device is moved over the work surface.

As shown in FIG. 5, side surfaces 61 of the second input device 450 may be rounded to provide a more comfortable grip for the user. Accordingly, a side wall 42 of the aperture 439 may be configured to receive the rounded second input device 450. In this embodiment, the user pushes the second input device 450 vertically downward into the aperture 439 to attach the second input device to the computer 20. A plurality of spring-loaded balls 38 or other engaging members may project from the sidewall 42 of the aperture 439 to engage the second input device 450 and prevent it from inadvertently detaching from the base 30. In one embodiment, the spring-loaded balls 38 are biased into the aperture 439 to engage corresponding depressions 63 in the sides 61 of the second input device 450. In other embodiments, the spring-loaded balls 38 may be positioned in the second input device 450 and the corresponding depressions 63 may be positioned in the side wall 42.

An advantage of the second input device 450 shown in FIG. 5 is that the curved sidewall 42 may provide the user with a more comfortable grip. A further advantage of the second input device 450 is that it may be operated in generally the same manner as a conventional mouse and may accordingly be more suitable for users who prefer such a method of operation.

Figure 6:
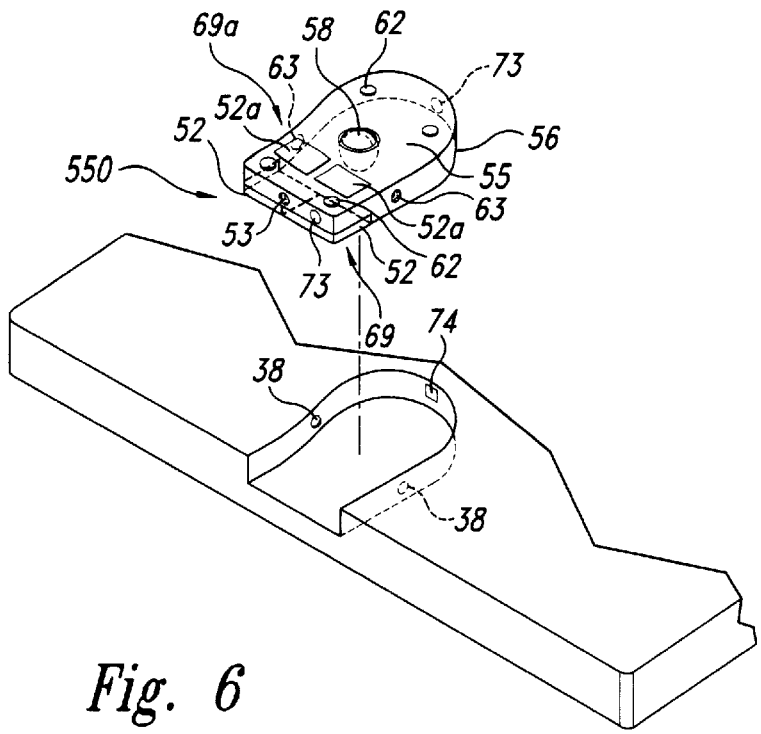
FIG. 6 is a top isometric view of the portion of the base shown in FIG. 5 configured to receive an input device in accordance with yet another embodiment of the invention.

In another embodiment shown in FIG. 6, the second input device 550 has top and bottom controls 69 and 69a so that it may be operated as a roller ball device in the attached position and a mouse in the detached position. In the attached position, the input device 550 may be inverted so that the lower surface 55 faces upward allowing access to the roller ball 58 and the controls 69a in the lower surface 55. Conversely, in the detached position, the input device 550 may be oriented so that the lower surface 55 faces downward. Accordingly, the second input device 550 includes input switches 52a positioned in the lower surface 55 as well as input switches 52 positioned in the upper surface 56. In one aspect of this embodiment, the input switches 52a may be flush with or recessed below the lower surface 55 so as to not interfere with the motion of the second input device 550 as it is translated over the work surface in the detached position. The second input device 550 may also include a plurality of transmitters 73 so as to more easily maintain communication with the receiver 74, regardless of the orientation of the second input device 550. The second input device 550 may further include a manual switch or automatic sensor 66 which corrects the input signal received from the roller ball 58 when the second input device is in the inverted position. The switch or sensor 66 may accordingly prevent the images on the display 81 (FIG. 1) from moving in a direction opposite the direction intended by the user when the user manipulates the roller ball 58 with the second input device 550 in the inverted orientation.

An advantage of the second input device 550 shown in FIG. 6 is that it may be used in either an upright or an inverted orientation. When the second input device 550 is in the inverted orientation (with the lower surface 55 facing upward), it may be used in either the attached position or the detached position as described above with respect to FIG. 4. When the second input device 550 is in the detached position, it may also be used in the upright orientation (with the lower surface 55 facing downward) as set forth above with reference to FIG. 5.

Figure 7:
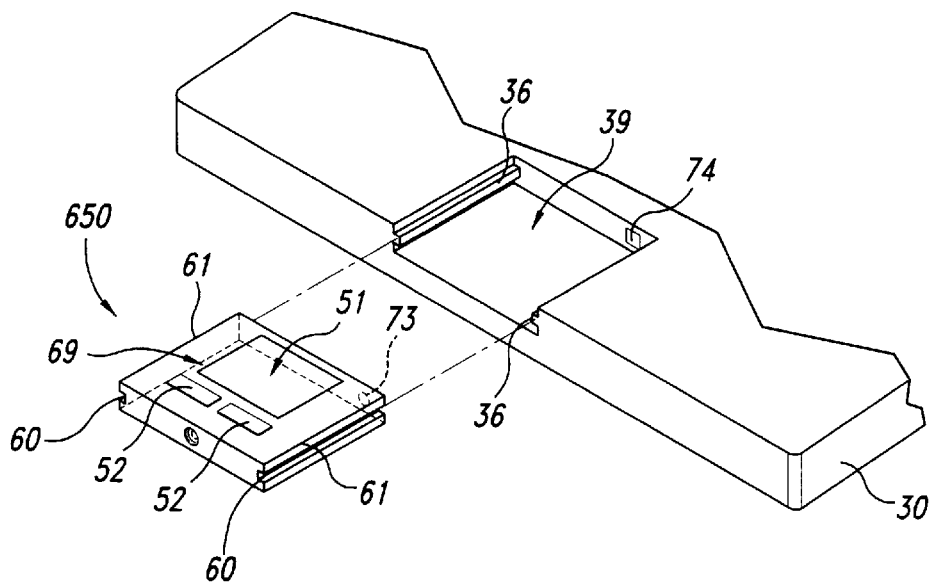
FIG. 7 is a top isometric view of a portion of the base of the computer shown in FIG. 1 having an aperture in an upper surface thereof configured to receive an input device in accordance with another embodiment of the invention.

FIG. 7 is a top isometric view of a second input device 650 in accordance with another embodiment of the invention having guide slots 60 extending along two side surfaces 61 of the housing 64. The guide slots 60 are configured to receive corresponding guide rails 36 extending along the aperture 39 in the base 30. To move the second input device 650 from the detached position to the attached position, the user slides the second input device 650 into the aperture 39 such that the guide rails 36 slide within the guide slots 60. In other embodiments, other means may be used to releasably attach the second input device 650 to the base 30 or other portions of the laptop computer 20. An advantage of the second input device 650 shown in FIG. 7 is that the guide rails 36 do not extend over the upper surface 56 of the second input device, so that the user may access a greater portion of the upper surface 56. This may be advantageous because the input controls 69 may be larger and easier to access while still fitting within the confines of the upper surface 56.

From the foregoing, it will be appreciated that, although specific embodiments of the invention have been described herein for purposes of illustration, various modifications may be made without deviating from the spirit and scope of the invention. For example, the second input devices shown in FIGS. 3–7 may include a cable 71 rather than the wireless communication link 170. Accordingly, the invention is not limited except as by the appended claims.

What is claimed is:

1. A laptop computer, comprising:
    a base having a keyboard;
    a display housing connected to the base to move between a stowed position in which the keyboard is inaccessible to a user and an unstowed position in which the keyboard is accessible to the user, one of the base and the display housing having an aperture therein;
    a detachable input device having a housing configured to be received in the aperture, the input device being movable relative to the aperture between an attached position in which the input device housing is received in the aperture and a detached position in which the input device housing is separated from the aperture, the input device further having a plurality of controls accessible for operation when the input device is in the attached position and when the display housing is in the unstowed position, wherein the base, the display housing and the input device are configured to be transported when the display housing is in the stowed position and the input device is in the attached position;
    a communication link operatively coupled between the input device and at least one of the base portion and the display housing to transmit signals therebetween; and
    a latch mechanism having a first member attached to the display housing and a second member attached to the input device, the first member being positioned to releasably engage the second member and secure the display housing to the input device when the display housing is in the stowed position.

2. The computer of claim 1 wherein the communication link comprises an electrical cable extending between the input device and at least one of the base and the display housing.

3. The computer of claim 1 wherein the communication link comprises an electrical cable extending between the input device and at least one of the base and the display housing, one of the input device and the at least one of the base and the display housing having a take-up device positioned to engage the cable and draw the cable toward one of the input device, the base and the display housing.

4. The computer of claim 1 wherein the communication link comprises a signal transmitter positioned in one of the input device, the base and the display housing and a signal receiver positioned in another of the input device, the base and the display housing.

5. The computer of claim 4 wherein the signal transmitter comprises an infrared signal transmitter and the signal receiver comprises an infrared signal receiver.

6. The computer of claim 4 wherein the signal transmitter comprises a radio signal transmitter and the signal receiver comprises a radio signal receiver.

7. The computer of claim 1 wherein the base has an aperture configured to receive at least a portion of the input device when the input device is in the attached position.

8. The computer of claim 7 wherein the base has a front surface, the aperture being positioned in the front surface of the base.

9. The computer of claim 7 wherein the base has a top surface, the aperture being positioned in the top surface of the base.

10. The computer of claim 1 wherein at least one of the base and the input device has a guide rail extending away from a surface thereof and the other of the base and the input device has a corresponding slot configured to removably receive the guide rail when the input device is moved from the detached position to the attached position.

11. The computer of claim 1 wherein the computer has at least one edge extending over a flange of the input device when the input device is in the attached position, the edge being positioned to restrict movement of the input device away from the computer.

12. The computer of claim 1 wherein the base has a first edge and a second edge opposite the first edge, and the display housing includes a display and has a first edge and a second edge opposite the first edge, the display housing being pivotably connected to the base to pivot between the first and second positions, the first edge of the display housing being spaced apart from the first edge of the base when the display housing is in the second position, the first edge of the display housing being proximate the first edge of the base when the display housing is in the first position, the input device being accessible to the user when the display housing is in the second position.

13. The computer of claim 1 wherein the input device comprises a housing and the controls comprise a sphere, a portion of which projects from the housing, the sphere being rotatable relative to the housing to receive commands from the user.

14. The computer of claim 13 wherein the sphere is accessible through an opening in a surface of the housing, the surface facing upwardly when the input device is in the attached position, the sphere further being positioned to receive the commands from the user when the surface faces downwardly and the sphere contacts a work surface as the user moves the housing on the work surface.

15. The computer of claim 14, further comprising a switch having a first state and a second state, the switch being positionable in the first state when the surface of the housing faces upwardly to generate a first signal from the commands of the user, the switch being positionable in the second state when the surface of the housing faces downwardly to generate a second signal from the commands of the user, the second signal being corrected relative to the first signal to account for a reversed direction of rotation of the sphere when the surface of the housing faces downwardly.

16. The computer of claim 1 wherein the input device comprises a touch-sensitive surface.

17. The computer of claim 1 wherein the input device comprises a joystick, the housing of the input device having a depression configured to receive the joystick therein in a fold-down position, the joystick being movable into the depression when the display housing is moved to the first position.

18. The computer of claim 1 wherein the base has a generally rectangular aperture and the input device has a generally rectangular outer perimeter sized and shaped to be removably received by the aperture.

19. The computer of claim 1 wherein the base has an aperture with a curved wall and the input device has a curved outer edge configured to be proximate to the wall of the aperture when the input device is at least partially received within the aperture.

20. The computer of claim 1, further comprising a biasing mechanism coupled to the base and the display housing to bias the display housing away from the base into the unstowed position, the display housing being secured to the input device in the stowed position only when the input device is in the attached position and the latch device is engaged with the display housing and the input device.

21. The computer of claim 3 wherein the take up device comprises a reel configured to have the cable wrapped thereon and a biasing member coupled to the reel to rotate the reel and wrap a selected length of the cable thereon.

22. The computer of claim 7 wherein the aperture is positioned in the base, the aperture having a first opening in a top surface of the base and a second opening in a front surface of the base, the aperture and the first opening being sized and shaped to removably receive the input device through the first opening, the second opening being sized and shaped to allow the user to access the controls therethrough.

23. The computer of claim 7, further comprising an engagement member connected to a wall of the aperture, the engagement member being biased toward and engaging the input device when the input device is in the attached position to restrict motion of the input device away from the aperture.

24. The computer of claim 1 wherein the input device housing has at least one surface configured to engage a substantially flat work surface and stably support the input device in a selected position relative to the work surface when the input device is in the detached position.

25. The computer of claim 24 wherein the at least one surface comprises a flat lower surface of the input device housing.

26. The computer of claim 24 wherein at least one surface comprises a plurality of projections configured to hold the input device steady against the flat work surface.

27. The computer of claim 24 wherein the at least one surface engages a surface of the base when the input device is in the attached position.

28. The computer of claim 1 wherein the input device comprises a housing and the controls comprise a sphere, a portion of which projects from the housing, the sphere being rotatable relative to the housing to receive commands from the user.

29. The computer of claim 28 wherein the housing comprises a first surface and a second surface opposite the first surface, the first surface facing upward when the input device is in the attached position, the sphere projecting through an opening in the first surface, the input device being configured to receive commands from the user when the input device is in the detached position, the first surface faces downward toward a work surface, the sphere contacts the work surface, and the user moves the input device on the work surface.

30. The computer of claim 29 wherein the controls comprise a first input switch proximate the first surface and accessible to the user when the first surface faces upward, and a second input switch proximate the second surface and accessible to the user when the first surface faces downward toward the work surface.

31. The computer of claim 29 wherein the first switch is movable between an active position in which the first switch transmits commands and an inactive position, the first switch remaining in the inactive position when the first surface faces downward toward the work surface.

32. An input assembly for a laptop computer having a base and a display housing coupled to the base, the display housing being movable relative to the base between a first position in which the computer is in a stowed configuration and a second position in which the computer is in an unstowed configuration, the computer having an aperture extending into one of the base and the display housing, wherein the computer is configured to be transported when in the stowed configuration, the input assembly comprising:

a detachable input device having a housing configured to be received in the aperture, the input device being movable relative to the aperture between an attached position in which the housing is received in the aperture and a detached position in which the housing is separated from the aperture, the input device further having a plurality of controls accessible for operation when the input device is in both the attached and the detached positions, the controls including a joystick, the housing of the input device having a depression configured to receive the joystick therein in a fold-down position, the joystick being moveable into the depression when the display housing is moved to the attached position, the display housing being movable to the first position when the input device is received in the aperture in the attached position; and a communication link operatively coupling the input device to the computer to transmit signals therebetween.

33. A laptop computer, comprising:

a base having a keyboard;

a display housing connected to the base to move between a stowed position in which the keyboard is inaccessible to a user and an unstowed position in which the keyboard is accessible to the user, one of the base and the display housing having an aperture therein;

a detachable input device having a housing configured to be received in the aperture, the input device being movable relative to the aperture between an attached position in which the input device housing is received in the aperture and a detached position in which the housing is separated from the aperture, the input device further having a plurality of controls accessible for operation when the input device is in the attached position and when the display housing is in the unstowed position, wherein the base, the display housing and the input device are configured to be transported when the display housing is in the stowed position and the input device is in the attached position;

a communication link operatively coupled between the input device and at least one of the base portion and the display housing to transmit signals therebetween; and a latch mechanism having a first member attached to the display housing and a second member attached to the input device, the first member comprising a tab extending away from a surface of the display housing and a projection at the end of the tab and being positioned to releasably engage the second member and secure the display housing to the input device when the display housing is in the stowed position, the second member comprising a surface of the input device having a hole to removably receive the projection.

34. A laptop computer, comprising:

a base having a keyboard, a display housing movably connected to the base to move between a stowed position in which the keyboard is inaccessible to a user and an unstowed position in which the keyboard is accessible to the user, one of the base and the display housing having an aperture therein; and a detachable input device having a housing configured to be received in the aperture, the input device being movable relative to the aperture between an attached position in which the input device housing is received in the aperture and a detached position in which the input device housing is separated from the aperture, the input device housing further having at least one surface configured to engage a substantially flat work surface and stably support the input device in a selected position relative to the work surface when the input device is in the detached position, the input device further having a plurality of controls accessible to receive commands from a user when the input device is in the attached position and when the input device is in the detached position, the controls including a sphere rotatable relative to the at least one surface, the sphere being positioned to engage the work surface when the at least one surface engages the work surface; and a communication link coupled between the input device and at least one of the base and the display housing to transmit signals therebetween.

35. A laptop computer, comprising:

a base having a keyboard;

a display housing connected to the base to move between a stowed position in which the keyboard is inaccessible to a user and an unstowed position in which the keyboard is accessible to the user, one of the base and the display housing having an aperture therein;

a detachable input device having a housing configured to be received in the aperture, the input device being movable relative to the aperture between an attached position in which the input device housing is received in the aperture and a detached position in which the housing is separated from the aperture, the input device further having a plurality of controls accessible for operation when the input device is in the attached position and when the display housing is in the unstowed position, wherein the base, the display housing and the input device are configured to be transported when the display housing is in the stowed position and the input device is in the attached position;

a communication link operatively coupled between the input device and at least one of the base and the display housing to transmit signals therebetween;

a latch mechanism having a first member attached to the display housing and a second member attached to the input device, the first member being positioned to releasably engage the second member and secure the display housing to the input device when the display housing is in the stowed position; and a biasing mechanism coupled to the base and the display housing to bias the display housing away from the base into the unstowed position, the display housing being secured to the input device in the stowed position only when the input device is in the attached position and the latch mechanism is engaged with the display housing and the input device.

36. A laptop computer, comprising:

a base having a keyboard;

a display housing connected to the base to move between a stowed position in which the keyboard is inaccessible to a user and an unstowed position in which the keyboard is accessible to the user, one of the base and the display housing having an aperture therein;

a detachable input device having a housing with a first surface and a second surface opposite the first surface, the housing configured to be received in the aperture with the first surface facing outward, the input device being movable relative to the aperture between an attached position in which the input device housing is received in the aperture and a detached position in which the housing is separated from the aperture, the input device further having a plurality of controls accessible for operation when the input device is in the attached position and when the display housing is in the unstowed position, the controls including a sphere projecting through an opening in the first surface and accessible to a user when the input device is in the attached position, the first surface facing downward toward a work surface with the sphere watching the work surface when the input device is in the detached position wherein the base, the display housing and the input device are configured to be transported when the display housing is in the stowed position and the input device is in the attached position;

a switch in the input device that automatically reverses signals generated by the sphere when the sphere is inverted from its attached position to its detached position;

a communication link operatively coupled between the input device and at least one of the base portion and the display housing to transmit signals therebetween; and a latch mechanism having a first member attached to the display housing and a second member attached to the input device, the first member being positioned to releasably engage the second member and secure the display housing to the input device when the display housing is in the stowed position.

37. The computer of claim 4 wherein the signal receiver is the only signal receiver of the computer and is positioned in the aperture of the display housing or the base.

* * * * *